Figure 1:
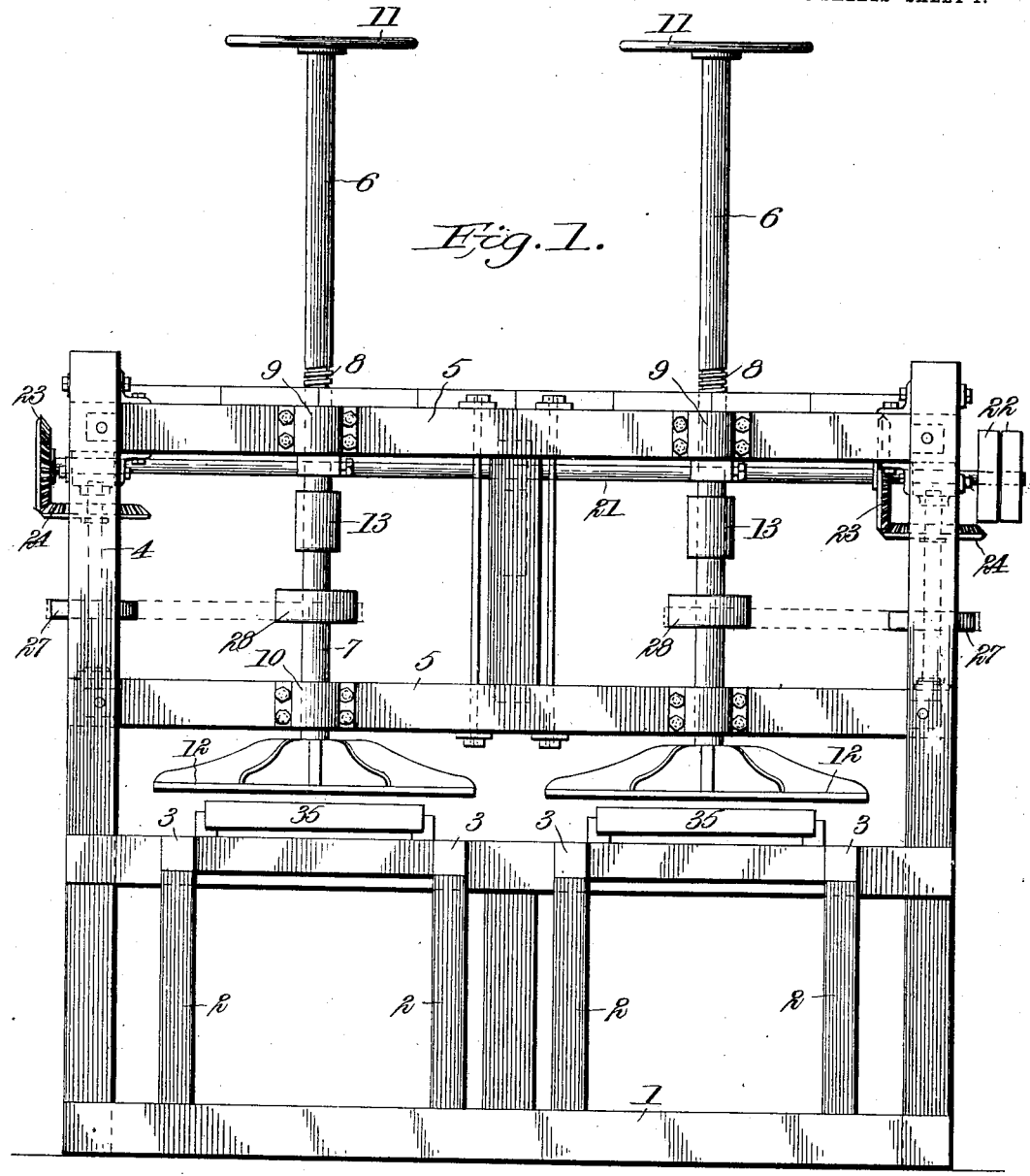

No. 761,201. PATENTED MAY 31, 1904.
J. W. CAMPBELL.
MOLDING APPARATUS.
APPLICATION FILED AUG. 26, 1903.
NO MODEL. 3 SHEETS—SHEET 1.

Witnesses
C. H. Walker
H. J. Shepard

Inventor.
J. W. Campbell,
By C. C. Shepard.
Attorney

No. 761,201. PATENTED MAY 31, 1904.
J. W. CAMPBELL.
MOLDING APPARATUS.
APPLICATION FILED AUG. 26, 1903.
NO MODEL. 3 SHEETS—SHEET 2.
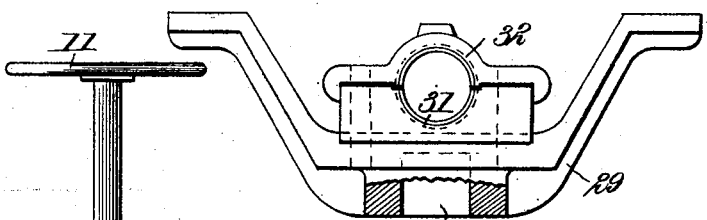
Fig. 4.
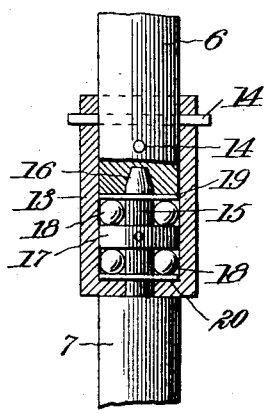
Fig. 3.
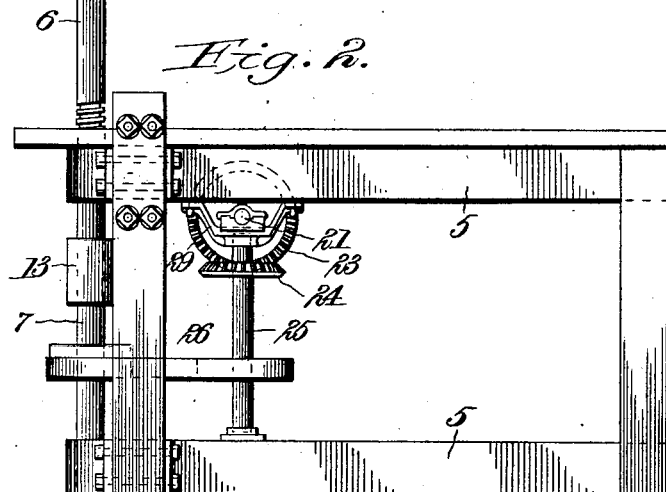
Fig. 2.
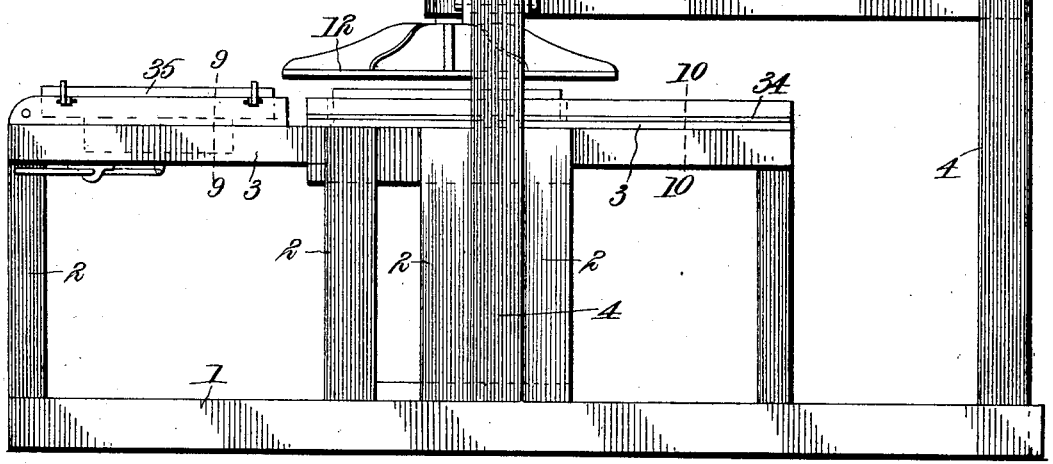
Fig. 4ª.
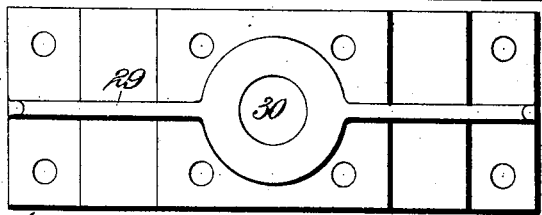
Witnesses
C. H. Watkins
H. S. Shepard
Inventor
J. W. Campbell
By C. C. Shepard
Attorney No. 761,201. PATENTED MAY 31, 1904.
J. W. CAMPBELL.
MOLDING APPARATUS.
APPLICATION FILED AUG. 26, 1903.
NO MODEL. 3 SHEETS—SHEET 3.
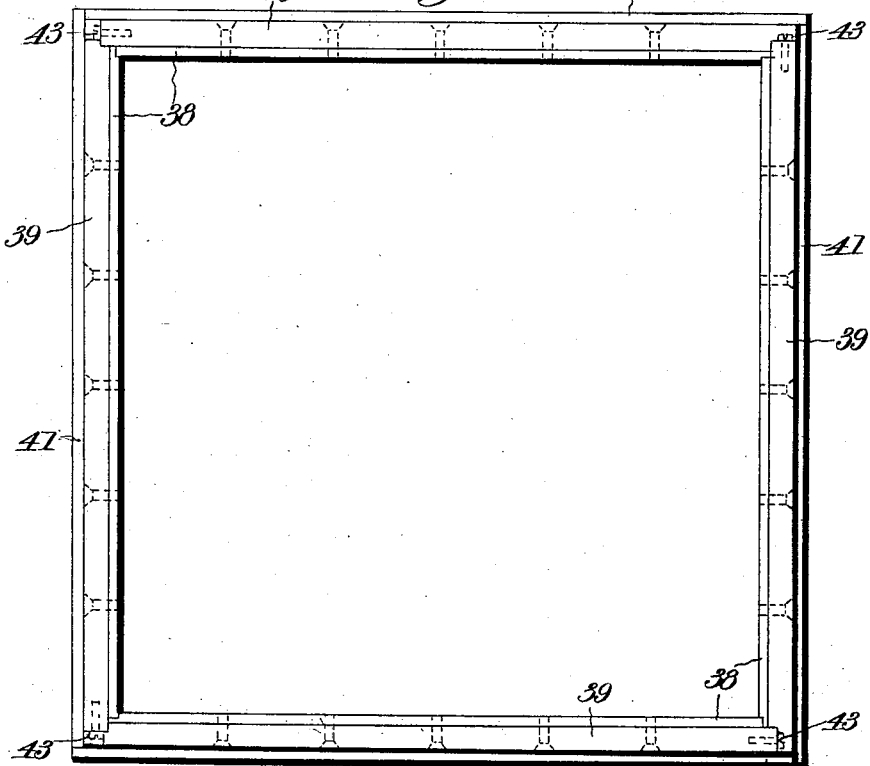
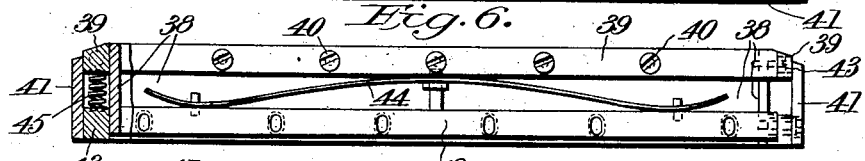
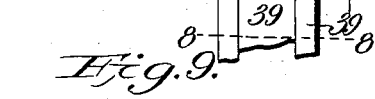
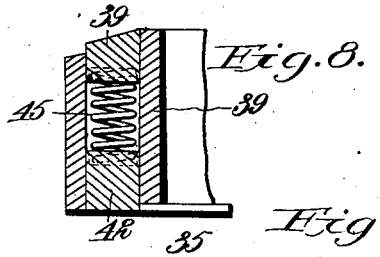
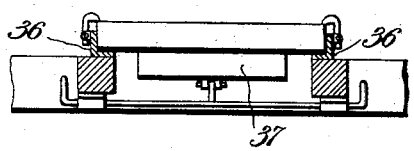
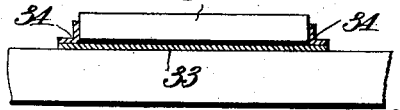

No. 761,201. Patented May 31, 1904.

UNITED STATES PATENT OFFICE.

JOHN W. CAMPBELL, OF COLORADO SPRINGS, COLORADO, ASSIGNOR OF ONE-FOURTH TO ROBERT B. COLLIER, OF COLORADO SPRINGS, COLORADO.

MOLDING APPARATUS.

SPECIFICATION forming part of Letters Patent No. 761,201, dated May 31, 1904.

Application filed August 26, 1903. Serial No. 170,853. (No model.)

*To all whom it may concern:*

Be it known that I, JOHN W. CAMPBELL, a citizen of the United States, residing at Colorado Springs, in the county of El Paso and State of Colorado, have invented a certain new and useful Improvement in Molding Apparatus, of which the following is a specification.

This invention relates to the art of molding cement tile, coping, cornice, and the like, and is designed to provide certain new and useful improvements whereby the completed article is a homogeneous mass and has a smooth finished surface free from pores and cells.

It is furthermore designed to secure a slicking or troweling action upon the exposed surface of the plastic material in the mold during the compression thereof, so as to work out the cream of the cement, and thereby give the completed article a smooth surface simultaneously with the compression of the material.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a front elevation of a molding apparatus embodying the features of the present invention. Fig. 2 is a side elevation thereof. Fig. 3 is an enlarged detail sectional view showing the swiveled connection between the members of the plunger-rod. Fig. 4 is a detail view of a shaft-bearing employed in connection with the present device. Fig. 5 is a detail plan view of the mold or flask used in connection with the present device. Fig. 6 is a side elevation of the flask, one of the outer side members being removed and one side being in section. Fig. 7 is an enlarged detail top plan view of one corner of the flask. Fig. 8 is a detail sectional view on the line 8 8 of Fig. 7. Fig. 9 is a detail sectional view on the line 9 9 of Fig. 2. Fig. 10 is a cross-sectional view taken on the line 10 10 of Fig. 2.

Like characters of reference designate corresponding parts in each and every figure of the drawings.

The work-table of the present apparatus is made up of base-sills 1, from which rise standards 2, having their upper ends connected by beams 3 for the support of the flask. Rising above the top of the rear portion of the table is a frame formed by the posts 4, connected by the cross-bars 5 for the support of the plunger and the means for operating the same.

Located above the interval between the adjacent beams 3 is a plunger-rod made up of upper and lower members 6 and 7, of which the upper member has a screw-threaded portion 8 engaging an internally-screw-threaded bearing 9 on the uppermost front cross-bar 5 of the frame, while the lower member has a bearing in an ordinary bearing-bracket 10 upon the lower front cross-bar. When the plunger is to be operated by hand, a suitable hand-wheel 11 is fitted to the upper end thereof; but it will of course be understood that the plunger-rod may be operated by any suitable power. A disk-shaped plunger-head 12 is carried by the lower end of the plunger-rod and is rigid therewith, so as to rotate with the rod, as will be hereinafter described.

It is designed to have the lower plunger-rod member capable of rotation independently of the upper member, and vice versa, and therefore a swiveled connection is employed between the two members, the particular form of which has been shown in Fig. 3, to which reference is now had. As shown by this figure, the lower end of the upper rod member is embraced by a sleeve 13, rigidly connected thereto by means of keys or fastenings 14, with the lower closed end of the sleeve projected below the said rod member. The upper end of the lower rod member is provided with a reduced cylindrical pin 15, which rotatably pierces the closed end of the sleeve and has its upper tapered end fitted in a socket or seat 16 in the lower end of the rod member 6. Intermediate of the stem and rigid therewith is an annular flange or shoulder 17, and at opposite sides of this shoulder is an annular series of antifriction-balls 18, suitable wear-plates 19 and 20 being interposed, respectively, between the upper set of balls and the lower end of the upper rod member and the lower set of balls and the bottom of the sleeve. By this construction a combined thrust-bearing and swiveled connection is provided between the plunger-rod members, whereby the lower rod member may remain fixed against rotation when the upper member is being rotated to feed the plunger downwardly, and said lower member may also be rotated independently of the upper member whenever desired.

In addition to compressing the material within the mold proper or flask it is designed to work out the cream of the cement, so as to secure a smooth homogeneous surface upon the completed article, and it is furthermore designed to carry out this operation through the medium of the plunger-head. To accomplish this result, the plunger-head is caused to rotate during its compression movement in a downward direction, so as to work upon the upper surface of the material in the mold with a troweling action, and thereby work the cream out of the cement and prevent bubbles and blisters upon the surface of the completed article.

For convenience in rotating the lower member of the plunger-rod a substantially horizontal drive-shaft 21 is mounted beneath the uppermost cross-bars of the frame and in rear of the plunger-rod and provided with a pulley 22 or other suitable means for connection with a source of power. Upon one end of this shaft is a beveled gear 23, which meshes with a substantially horizontal gear 24 upon the upper portion of an upright counter-shaft 25, and power is transferred from the counter-shaft to the lower rod member 7 by means of a belt 26, running around a pulley 27 upon an intermediate portion of the counter-shaft and a broad-faced pulley 28 upon the plunger-rod member 7. It will be noted that the face of the pulley 28 on the plunger-rod is comparatively broad to compensate for the vertical movement of said rod.

In order that the upright counter-shaft 25 may be in direct alinement beneath the drive-shaft, it is designed to mount the upper end of the counter-shaft in the same bearing with that for the drive-shaft, which is accomplished by means of the bracket shown in Fig. 2 and illustrated in detail in Fig. 4. This bracket consists of a hanger 29 of substantially U shape, having its legs secured to the under side of the adjacent cross-bar of the frame and provided intermediately in its under side with a socket 30 for the reception of the upper end of the counter-shaft 25. Supported within the hanger is a bearing-block 31, having a concaved seat in its top for the reception of the drive-shaft and a cap member 32 to fit over the top of the shaft and hold the same in the seat of the block.

As best indicated in Fig. 2 of the drawings, it will be seen that the work-table extends in front and rear of the plunger-head, the rear portion of the table forming the "striking-table," where the surface of the material in the mold or flask is struck off to level it before being placed beneath the plunger, while the front portion forms the "kicking-table," where the molded material is kicked or forced out of the mold. Upon the intermediate or press portion of the table is a metallic plate 33, which also extends to the rear end of the striking-table, and upon this plate is placed track members 34, which are substantially L-shaped in cross-section, as best shown in Fig. 10 of the drawings. These track members are designed to receive between them the flask or mold 35, so as to effectually guide the latter when it is pushed forwardly under the plunger-head. After the plunger-head has been depressed so as to compress the material in the mold the latter is pushed onto the kicking-table, which also has track members 36 for the reception of the mold, and then the molded article is pushed or kicked from the mold by means of a push-block 37 in the usual or any preferred manner.

The preferred form of flask for use in connection with the present apparatus has been shown in Figs. 5 to 8, inclusive, wherein it will be noted that the flask consists of inner and outer members. The inner member has each side made up of a longitudinal plate 38, stood on edge, and a bar 39, substantially rectangular in cross-section, applied to the outer side of the plate at the upper edge thereof and connected thereto by means of suitable fastenings 40. The outer member consists of an outer plate 41 and a bottom bar 42, secured to the inner face of the plate at the bottom thereof. As indicated in Fig. 5, it will be noted that the abutted ends of the top bars 39 are mortised and connected by fastenings 43, so as to connect the four sides of the inner member, and a similar connection is employed between the bars 42 of the outer member. By this construction and arrangement there is an annular space extending entirely around the flask between the inner and outer members thereof, and in this space is a convolute spring 44, one for each side of the flask, bearing against the upper and lower bars 39 and 42, so as to yieldably support the inner frame member in an elevated position, and thereby permit compression of the flask under the action of the plunger during the pressing operation. Suitable helical springs 45 are placed in each corner of the flask and between the top and bottom bars, so as to prevent unequal tilting of the inner flask member at its corners.

In the operation of the apparatus the yieldable flask is placed upon the striking-table with the usual follower-board within the lower portion of the flask and beneath the inner member thereof, there of course being a space between the lower edge of the inner flask member and the follower-board to permit depression of said inner flask member. The plastic filler material is then placed within the flask and struck off in the usual manner, after which a surfacing material of pure liquid cement is poured over the top of the filler. The flask is then slid upon the tracks 34 to a position beneath the plunger 12, and the latter is then moved downwardly into contact with the upper surface of the material and the top edge of the inner flask member. During the downward movement of the plunger the inner flask member also moves downwardly therewith, whereby an effective compression of the material is secured without loss or escape of any portion thereof, for the reason that the plunger fits snugly upon the top edge of the inner flask member. Moreover, as the plunger-head rotates during its downward movement it has a slicking or troweling action upon the surfacing of pure cement, thereby to work out all bubbles and porous places occasioned by reason of air seeking to escape upwardly through the material. When the inner flask member has reached its lower limit by contact with the follower-board, the downward movement of the plunger is stopped, and said plunger is then elevated. At this point it will be noted that the plunger-head rotates in its retraction movement as well as in its forward movement, and this is of utmost importance, for the reason that the revolving head gradually leaves the surface of the material without producing a suction thereon, thereby giving the upper surface of the article a smooth finish instead of a rough surface, as would result if the plunger was drawn away in a straight line without rotation.

By the employment of a yieldable or compressible flask it is apparent that none of the material can ooze out between the top of the flask and the plunger-head, whereby all of the material is retained within the flask and is effectually compressed into a homogeneous mass. It is therefore a very important feature of the present invention to employ a compressible flask in combination with a plunger-head of a diameter to rest upon the top of the flask to compress the same simultaneously with the compression of the material. It is also of importance that the plunger-head be rotated during the compression operation in order that bubbles and air-holes may be worked out of the surface and that the head also be rotated when leaving the material so as to avoid suction and produce a smooth finished surface by reason of its troweling or slicking operation.

Having thus described the invention, what is claimed, and desired to be secured by Letters Patent, is—

1. In a molding apparatus, the combination with a frame, of a screw-threaded bearing thereon, a reciprocating plunger-rod made up of sections, one of which is screw-threaded and engaging the bearing, the other section having a positive swiveled connection with the screw-threaded section, a plunger-head carried by the swiveled section, and means for rotating the swiveled section independently of the screw-threaded section.

2. In a molding apparatus, the combination with a table, and a frame rising above the same, of a vertically-disposed plunger-rod having a lower swiveled section, a plunger-head carried by the swiveled section, means for reciprocating the plunger-rod, a broad-faced pulley upon the rotatable rod-section, a drive-shaft upon the frame, a vertical counter-shaft connected to the drive-shaft and provided with a pulley, and a belt running around the pulleys of the counter-shaft and the rotatable rod-section.

3. In a molding apparatus, the combination with a table having an intermediate press portion with a striking portion at one side thereof and a kicking portion at the opposite side of the press portion, tracks leading from the striking-table across the press-table to the kicking-table, of a frame rising above the press portion of the table, an upper screw-threaded bearing upon the frame and a lower bearing, a vertically-movable plunger-rod made up of an upper section having a screw-threaded portion engaging the threaded bearing and a rotatable lower section swiveled to the upper section and mounted in the lower bearing, a plunger-head carried by the rotatable rod-section, means for rotating the upper rod-section independently of the lower section, and means for rotating the lower section independently of the upper section.

4. In a molding apparatus, the combination with a plunger, of a flask made up of inner and outer members of which the inner member is normally projected above the outer member and into the path of the plunger with its lower edge terminated short of the bottom of the outer member, and springs interposed between the two members to yieldably support the inner member.

5. In a molding apparatus, the combination of a plunger having a rotatable head, and a flask made up of inner and outer members, of which the inner member is projected above the outer member and into the path of the plunger-head, said inner member also being yieldably supported so as to yield under the compression action of the plunger-head.

JOHN W. CAMPBELL.

In presence of—
 LE C. PERKINS,
 VIRGIL COOPER.